United States Patent [19]
Franks, Jr.

[11] Patent Number: 4,993,960
[45] Date of Patent: Feb. 19, 1991

[54] GROUNDING SYSTEM AND CLAMP

[76] Inventor: George J. Franks, Jr., Inverness, Ill.

[21] Appl. No.: 204,397

[22] Filed: Jun. 9, 1988

Related U.S. Application Data

[63] Continuation-in-part of Ser. No. 116,899, Nov. 3, 1987, Pat. No. 4,828,504.

[51] Int. Cl.$^5$ ............................................. H01R 4/66
[52] U.S. Cl. .......................................... 439/92; 174/6; 361/119; 439/433; 439/803
[58] Field of Search ............... 439/92, 95, 97, 100, 439/431, 433, 434, 435, 444, 803, 813; 174/6, 7, 51; 361/117, 118, 119, 364, 369, 372; 379/397, 412

[56] References Cited

U.S. PATENT DOCUMENTS

| | | | |
|---|---|---|---|
| 2,260,136 | 10/1941 | Bergan | 174/51 |
| 2,632,068 | 3/1953 | Froebel et al. | 439/803 X |
| 4,538,879 | 9/1985 | Wagener | 439/803 X |
| 4,626,051 | 12/1986 | Franks, Jr. | 439/813 X |
| 4,776,808 | 10/1988 | Davidson | 439/100 |
| 4,904,193 | 2/1990 | Graves | 439/92 |

FOREIGN PATENT DOCUMENTS

| | | | |
|---|---|---|---|
| 1132999 | 7/1962 | Fed. Rep. of Germany | 174/6 |
| 1126748 | 11/1956 | France | 439/433 |

Primary Examiner—Eugene F. Desmond
Attorney, Agent, or Firm—Jenner & Block

[57] ABSTRACT

A system and clamp provides a common system for grounding a telephone system and an electrical power system. The clamp is secured to an electrical meter box and the clamp is connected through a grounding connection to the telephone system. The clamping device incudes a C-shaped base mounting a threaded bolt having a serrated end surface for abrading the surface of the meter box and additionally includes at least one projecting point which prevents the clamp from moving on the box as the clamping device is secured to the box.

22 Claims, 2 Drawing Sheets

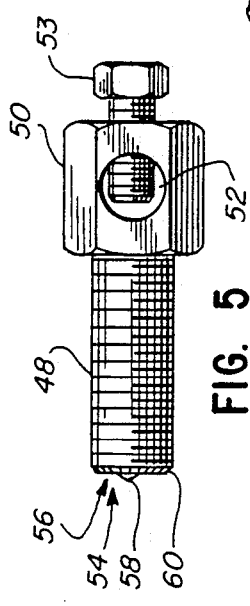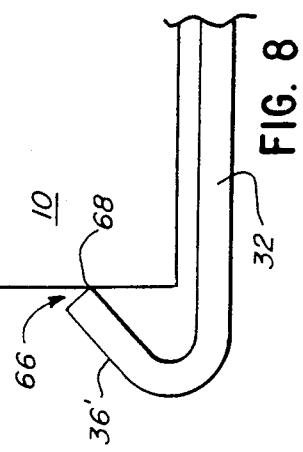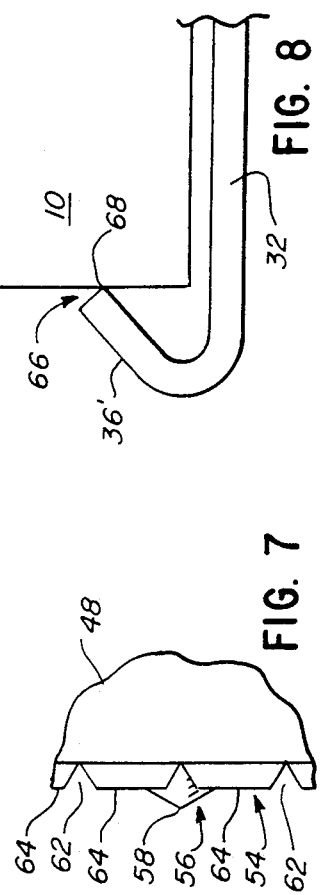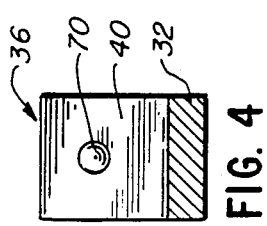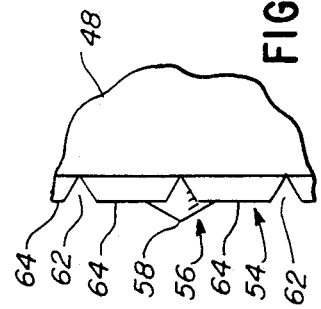

GROUNDING SYSTEM AND CLAMP

This is a continuation-in-part of application Ser. No. 116,899, filed Nov. 3, 1987, now U.S. Pat. No. 4,828,504.

FIELD OF THE INVENTION

The present invention relates to a grounding system and a grounding clamp for electrically grounding conductors. In a particular embodiment, a system for grounding a telephone system to an electrical power system is provided. The grounding system utilizes common parts which eliminates the necessity for multiple and separate grounding mechanisms for each system.

BACKGROUND OF THE INVENTION

In providing electrical power service and telephone service to a building, separate electrical grounding systems are typically provided for each type of service. For example, an electrical utility box containing a meter will have a riser or ground level connector which supplies power to the building. An elongated ground rod is sunk into the ground and connected through heavy gauge wire to the electrical utility box for grounding purposes.

Adjacent to the electric utility box may be the telephone system interface box. The telephone system interface box is typically connected through a riser to the telephone line from the telephone company. Again, a separate elongated ground rod will be sunk, typically within several feet of the power ground rod, and run through wire of lower gauge to the telephone system interface box for grounding purposes.

To reduce the potential difference between the telephone wiring and the electrical system, it is then necessary to connect a jumper wire or bond between the telephone system ground rod and the electrical power system ground rod to prevent differences in potential which could result in uncontrolled arcing between the telephone wiring and the electrical system in the event of lightning or accidental contact with the telephone line, for example.

While the foregoing procedures provide adequate grounding of the power system and telephone system and reduce potential differences therebetween, the cost and complexity is high in that two pairs of grounding rods, clamps, grounding wires as well as the ground jumper wire or bond are required. All these various elements require installation, in addition to the cost and complexity of the hardware itself.

A single grounding system would be desirable, but has proved elusive. The telephone ground rod is typically of much smaller diameter and length than the power ground rod and could not adequately handle the more substantial requirements for the power system. The power ground rod is buried and the available metal conductors such as the utility meter box are painted and/or treated with a coating &o prevent rusting and provide for long term life. Further, drilling a hole through the electric utility box is highly undesirable in that entry of foreign matter and moisture into the electric utility box is then allowed. Any system must recognize the realities of adverse conditions including dirt, paint, and other non-conducting surfaces, as well as corrosion, which must be addressed in order to insure a suitable mechanical and electrical connection which will withstand the rigors of an outdoor environment.

Various clamping devices have been known in the art to provide an electrical ground. These include C-clamps and various forms of strap connectors. However, it has not been apparent that any of the known clamping devices could overcome the problems inherent in the current system of providing separate grounding systems for the electrical power system and the telephone system.

SUMMARY OF THE INVENTION

In accordance with the present invention, a novel system and clamp are disclosed which provides a common system for grounding the telephone system and the electrical power system. A novel clamp having an elongated base is connectable to the electrical meter box of the power system which includes securing means for penetrating the outer surface of the utility box without penetrating the inside of the utility box. Problems with the entry of moisture and various contaminants are avoided since the inside of the box is not penetrated. This novel clamp is then connected through a ground wire to the telephone system interface box in order to provide the ground connector for the telephone system, eliminating the need for a separate telephone system ground rod, clamp, as well as the ground wire bond heretofore provided between the telephone system ground rod and the electrical power system ground rod.

More specifically, the clamping device comprises an elongated C-shaped clamp which connects to the opposite sides of the electrical utility box. The securing device for the clamp includes a serrated end surface which will abut and abrade the painted surface of the utility box and additionally includes a projecting point which prevents the clamp from moving or "walking" off the surface of the utility box as the system is secured to the box. At the opposite end of the clamping device, another projecting point or other mechanism is used to similarly prevent inadvertent movement or "walking" of the device as it is being secured.

The simplicity of the device and its ease of attachment provide for an effective electrical ground for the telephone system that can be formed by persons having no special training. Thus, even consumers of the telephone system, when installing a telephone interface box, can accomplish an adequate ground without the need for special tools. Further, the burying of the telephone system grounding rod is no longer necessary. Labor normally associated with establishing an adequate telephone system ground is generally eliminated.

The novel clamp which is utilized for this purpose has utility for any metal box enclosure to which an electrical conductor is to be both mechanically and electrically secured for grounding purposes or other reasons for forming an electrical connection to the utility box itself. This is accomplished by a securing mechanism which does not penetrate through the utility box and thus does not compromise its integrity and ability to withstand moisture and contaminants.

One object of this invention is to provide a system for grounding a telephone system and electrical power system through a single ground rod and ground wire which serves the dual purpose of grounding both systems without comprising the integrity of either system.

Another object of this invention is to provide a system for grounding the telephone and power systems through a clamping device connectable to an electric utility box and having a securing clamp which forms an adequate electrical and mechanical connection without penetrating through the utility box and compromising its integrity.

It is a further object of this invention to provide an improved clamping device which is connectable to a metal box enclosure on opposite sides of the box and having a securing means for penetrating the outer surface of the box without penetrating the inside of the box, and including mechanisms to prevent inadvertent movement of the clamp while being clamped.

Other objects and advantages of the invention will become apparent upon the following detailed description with reference to the drawings, like reference numerals refer to like parts.

BRIEF DESCRIPTION OF THE DRAWINGS

FIG. 3 is an enlarged front plan view of the clamp shown in FIG. 1;

FIG. 4 is a sectional view of the clamp illustrated in FIG. 3 taken along lines 4—4;

FIG. 5 is an enlarged front plan view of the threaded bolt illustrated in FIG. 3;

FIG. 6 is an enlarged view of the end portion of the threaded bolt of FIG. 5;

FIG. 7 is an enlarged view of a portion of the leading or cutting structure formed on the end of the threaded bolt; and FIG. 8 is a partial side view of another embodiment for the first side portion of the claim shown in FIG. 3.

DESCRIPTION OF THE PREFERRED EMBODIMENT

Figures 1, 2:
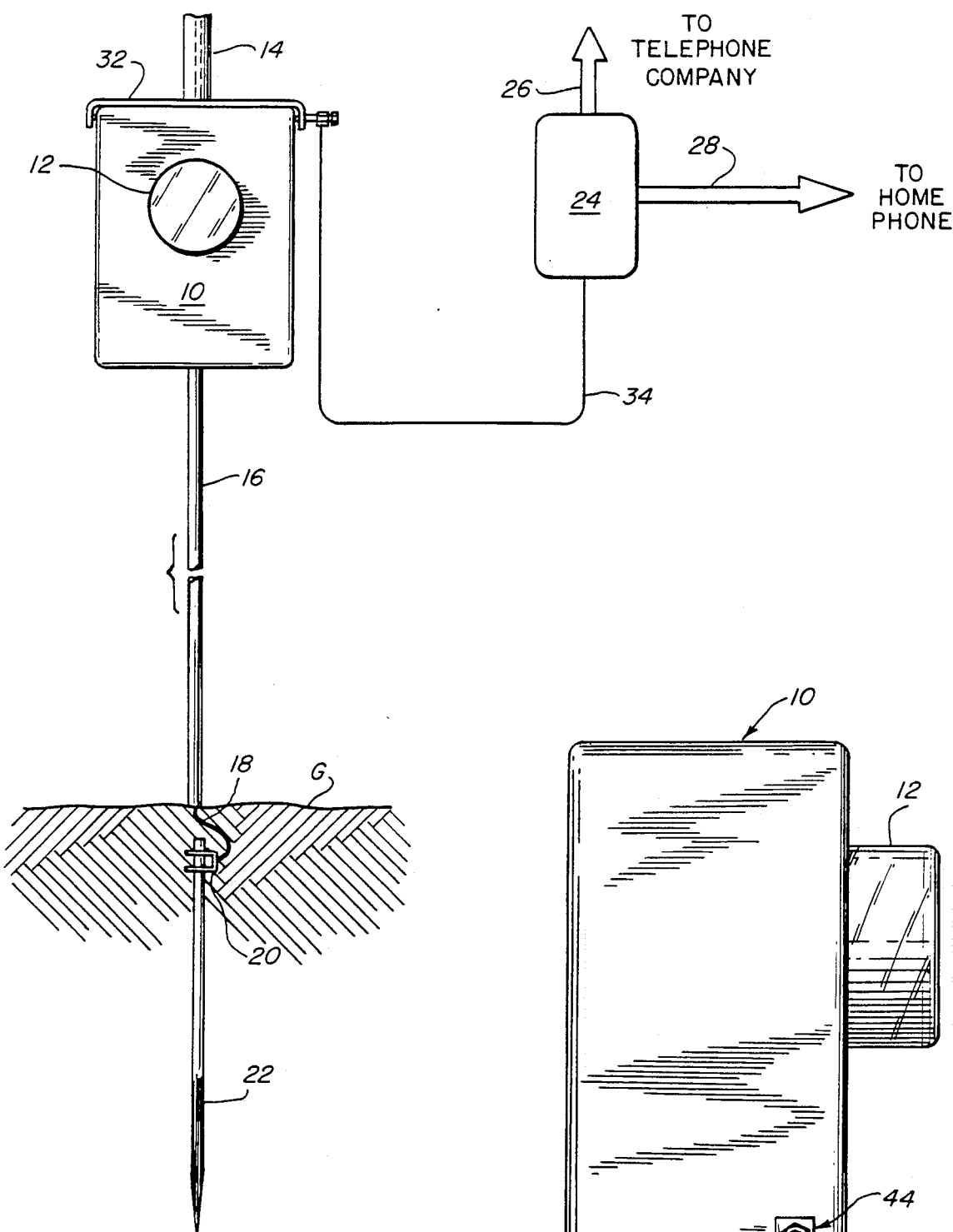
FIG. 1 is a front plan view of one embodiment of the invention.
FIG. 2 is an elevated partial side view of the embodiment of the invention in FIG. 1, illustrating an alternate placement of the clamp.

Electrical power and telephone service are typically connected through overhead risers or buried underground cables to interface equipment located on the outside of a building. FIG. 1 illustrates some of the interface equipment mounted to a side of the building including an electrical utility box 10 of rectangular shape which mounts a power meter 12 for determining the amount of power consumption being utilized within the building. A hollow conduit or riser 14 extends upwardly in the case of overhead service, or alternatively, the box may be an elongated structure extending downwardly (not illustrated) and partially buried into the ground through which the power cables would be led from an underground feeder system.

Whether the utility box has an overhead feed or an underground feed, the me&:al box itself must be electrically connected to ground G through a suitable grounding system. For example, a conduit 16 holds a large size grounding wire 18 which is connected through a clamp 20 to an elongated grounding rod 22 sunk into the ground G. Typically, this grounding rod 22 may be six feet or more in length and is located within three feet or other close proximity to the base of the building. Ground wire 18 is then connected to a grounding bracket (not illustrated) within the electric utility box in a known manner.

Located closely adjacent the electric utility box 10 will be a telephone interface box 24 which is mounted to the wall of the building. Telephone interface box 24 is connected through an overhead riser or underground feed to the external telephone company system 26. The telephone lines are connected through interface box 24 to the building phone system through conventional wiring 28. Interface box 24 must also be grounded suitably to the same ground G in a manner which will not cause a potential difference between the telephone system and the electrical power system in the event that lightning or accidental electrical contact should be made to the telephone wires themselves.

The system described above is conventional and may take a wide variety of known configurations. Previously, the telephone interface box has been coupled through a ground wire to a separate ground rod (not illustrated) located a short distance away from the power ground rod. This requires a separate ground rod and cable to telephone interface box 24, and also a bond or jumper wire (not shown) connected between the pair of grounds rods in order to prevent any potential difference therebetween. In accordance with the present invention, the complexity of this prior system and the labor necessary to install it are eliminated by a system which can be installed by persons without specialized training and without comprising the integrity of the electrical power system or the telephone system.

A clamp 30 having an elongated base 32 is mechanically and electrically connectable to utility box 10. The elongated base 32 is longer than one of the sides of the box so as to extend beyond the box side. A pair of arms then extend from the ends of the case to engage and clamp the box therebetween, as will be apparent. Clamp 30 includes securing means for penetrating the outer surface of utility box 10 without penetrating the inside of utility box 10. Clamp 30 further includes a ground wire securing mechanism 44 in the form of a further clamping device for securing a ground wire 34 to the clamp and through the wire 34 to the telephone interface box 24. Ground wire 34 is connected to telephone interface box 24 in a conventional manner. Ground wire 34 is typically AWG size 6 through 12, inclusive.

Clamp 30 provides a mechanical connection to utility box 10, and also the necessary electrical connection for grounding the telephone system to utility box 10 which in turn is grounded through ground wire 18 to the ground rod 22. A separate telephone system ground rod, clamp, and ground wire bond are avoided since the telephone system is electrically connected to the power system ground. While the clamp 30 is illustrated as located on top of the utility box 10 in FIG. 1, alternate placements are possible, such as on the bottom of the box as illustrated in FIG. 2. While the system is illustrated in connection with an electrical utility box, it will be apparent that the novel clamp 30 can be used anytime an electrical and mechanical connection is to be made to a metal box enclosure. The electrical connection can be for purposes of grounding or for any other purpose for which an electrical connection is to be made to a metal, electrically conductive, box enclosure.

Referring to FIGS. 3-8, the novel clamp 30 can be considered an elongated C-shaped or U-shaped clamp and includes a first arm or side portion 36 and a second arm or side portion 38 extending upwardly from a common, elongated base 32. First and second side portions 36 and 38 have first and second inner surfaces 40 and 42, respectively.

As illustrated in FIG. 3, first and second side portions 36 and 38 are substantially of the same shape and substantially parallel to each other. First and second inner surfaces also substantially oppose each other. In an alternate embodiment illustrated in FIG. 8, however, first side portion 36' may form an angle less than 90 degrees and approaching 45 degrees with base 32. First side portion 36' is thus inclined towards second side portion 38.

Clamp 30 includes a securing device 44 to form the mechanical and electrical connector to the box, in the form of a threaded bolt with a special end surface for engaging the box. In one embodiment, securing device 44 comprises a threaded opening 46 formed through second side portion 38 and a threaded stud or bolt 48 located therein. Bolt 48 is fine threaded to permit a greater amount of rotational or turning motion against utility box 10. Bolt 48 is formed of a electrically conducting metal material, such as a heat-treated beryllium copper alloy.

As illustrated in FIGS. 3 and 5, a hexagonally-shaped head 50 is formed on bolt 48. A bore, preferably coaxial with opening 46, is formed through head 50. This bore is threaded to accommodate ground wire securing screw 53. Securing screw 53 functions to secure ground wire 34 (see FIG. 1) to bolt 48 to establish a mechanical and electrical connection therebetween.

The terminal or free end 54 of bolt 48 has a special end surface 56. A center point 58 extends outwardly from end surface 56. Center point 58 is generally cone-shaped. However, center point 58 may be of various shapes. Preferably, as illustrated in FIG. 5, center point 58 extends for a relatively short length past end surface 56. Center point 58 is used to prevent inadvertent movement or "walking" of the clamp 30 as it is being secured.

The edge of end surface 56, best illustrated in FIGS. 5-7, is formed with an abrading surface 60 comprising grooves 62 and ridges 64. Depending on the hardness of the material to which the clamp is to be applied, however, conventional machining techniques used in the fabrication of bolts may provide an abrading surface of sufficient roughness to grind through the material of the box. Likewise, other penetrating end surfaces are usable including scoring or cutting. Alternatively, a knife-like edge (not shown) may be provided, such as disclosed in the inventor's copending application Ser. No. 116,899, filed Nov. 3, 1987 and entitled "CLAMP", the disclosure of which is hereby incorporated by reference into this application.

As head 50 of bolt 48 is turned to secure clamp 30 to utility box 10, center point 58 contacts utility box 10 before the abrading surface 62 and first begins to penetrate the outside surface of utility box 10. As bolt 48 is rotated, the abrading surface 60 rotates into engagement to penetrate the outer surface of utility box 10. Abrading surface 60 mechanically scrapes the paint or other coating covering the box, and also penetrates dirt and/or corrosion from the outside surface of utility box 10. An electrical connection is thereby provided between bolt 48 and utility box 10. The point 58, which first penetrates the box, holds the bolt 48 against inadvertent movement or "walking" as abrading surface 60 is grinding or digging into the surface of the box.

Mechanisms for preventing inadvertent movement or "walking" of first side portion 36 are also provided as illustrated in FIGS. 3-4 and in FIG. 8. In FIGS. 3-4, a second, cone-shaped point 70 is formed on inner surface 40 which extends outwardly towards second side portion 38. First side portion 36, as shown, is substantially parallel to second side portion 38. The center line of opening 46 is preferably coaxial with the center line of second point 70.

Second point 70 is preferably formed of a material with a hardness greater than the hardness of the material to which clamp 30 is being secured. For this purpose, the point 70 may be a hardened insert having a cylindrical body 72 which snugly fits into a bore 74 formed through first side portion 36. In such a case, the remainder of the clamp can be formed of a softer material.

As clamp 30 is being tightened to utility box 10, second point 70 penetrates the outer surface of utility box 10, thereby preventing walking. Second point 70 is preferably of a length so that second point 70 does not penetrate the inner surface of utility box 10.

Alternatively, as illustrated in FIG. 8, the side portion 36' is inclined at an angle so that the upper, innermost edge 68 will engage the box and dig in sufficiently to prevent walking. Contact edge 68 may comprise a knife edge, or alternatively, a serrated edge. Contact edge 68 functions to prevent inadvertent movement when clamp 30 is being tightened. The manufacturing of clamp 30 is simplified in this embodiment since second point 70 of FIGS. 3-4 is eliminated.

While the invention is described in connection with preferred embodiments, it will be understood that it is not intended to limit the invention to these embodiments. On the contrary, it is intended to cover all alternatives, modifications and equivalents as may be included in the spirit and scope of the invention as described by the appended claims.

What is claimed is:

1. A system for grounding a telephone system and an electrical power system, comprising:
   an electric utility box for the electrical power system;
   a ground mechanism;
   a first electrical conductor connecting the ground mechanism to the utility box for electrically grounding the utility box;
   a clamping device connected to the utility box and having securing means for penetrating the outer surface of the utility box without penetrating the inside of the utility box; and,
   a second electrical conductor for connecting the clamping device to a ground connection for the telephone system, whereby the ground mechanism for the electrical power system serves the dual purpose of grounding the telephone system.

2. The system of claim 1 wherein the electric utility box is generally rectangular and includes side surfaces which enclose the box, the clamping device comprising an elongated base longer than one of the side surfaces with a pair of arms extending from the ends of the base, the arms being located adjacent opposing side surfaces of the box, one of the arms mounting the securing means for penetrating the adjacent outer side surface of the utility box.

3. The system of claim 2 wherein the clamping device comprises an element having one end moveable against the outside surface and an opposite end containing a further clamping device for clamping the second electrical conductor to the securing means.

4. A system for grounding a telephone system and an electrical power system, comprising:
   an electric utility box for the electrical power system;
   a ground mechanism;
   a first electrical conductor connecting the ground mechanism to the utility box for electrically grounding the utility box;
   a clamping device with a portion having a threaded opening adjacent the box and a threaded bolt movable within the threaded opening and having an abrasive end surface for abutting and abrading the outer surface of the box as the bolt is rotated for penetrating the outer surface of the utility box without penetrating the inside of the utility box; and a second electrical conductor for connecting the clamping device to a ground connection for the telephone system, whereby the ground mechanism for the electrical power system serves the dual purpose of grounding the telephone system.

5. The system of claim 4 wherein the threaded bolt has a center point extending outwardly beyond the abrasive end surface to abut the outer surface of the box before the abrasive end surface makes contact.

6. The system of claim 4 wherein the clamping device includes a second portion connected to the first portion by a common base, the second portion being inclined towards the first portion, at least a portion of an edge of the second portion having an abrasive edge surface to engage the outer surface of the box and prevent the second portion from moving across the outer surface as the clamping device is secured to the box.

7. The system of claim 4 wherein the threaded bolt includes a head having formed therein a bore for receiving a grounding wire, a threaded opening in the head and extending into the bore, and a securing screw located within the threaded opening for securing a grounding wire to the head.

8. The system of claim 4 wherein the clamping device includes a second portion substantially parallel and opposing the first portion, the second portion having a point extending outwardly therefrom toward the first portion to abut the outer surface of the box whereby the point serves to prevent the second portion from moving across the outer surface as the clamping device is being secured to the box.

9. The system of claim 8 wherein the center line of the threaded opening is coaxial with the center line of the point on the second portion.

10. A clamping device for mechanical and electrical connection to a metal box, comprising:

a elongated base which spans the box and having a pair of arms extending from ends of the base for positioning the arms adjacent opposite sides of the box, the elongated base being substantially longer than the length of the arms, one of the arms being engageable with its adjacent side of the box, the other of the arms including a threaded opening and a threaded bolt moveable therein into engagement with the adjacent side of the box;

first means on an end of the threaded bolt for abrading the outer surface of the side of the box to penetrate the outer surface without penetrating the inside of the hollow box, and the end of the threaded bolt includes second means for preventing the clamping device from inadvertent movement across the sides of the box as the threaded bolt is being tightened.

11. The clamping device of claim 10 wherein the arm engageable with its adjacent side of the box includes additional means for preventing the clamping device from inadvertent movement across the sides of the box as the threaded bolt is being tightened.

12. The clamping device of claim 10 wherein the first means for abrading comprise a serrated end surface for abutting and abrading the outer surface of the box as the threaded bolt is rotated.

13. The clamping device of claim 10 wherein the second means for preventing inadvertent movement comprises a center point on the end of the threaded bolt extending outwardly beyond the abrading end surface to abut the outer surface of the box.

14. The clamping device of claim 10 wherein an additional means for preventing inadvertent movement is on the arm engageable with its adjacent side of the box and comprises a point formed on the engageable arm which abuts the outer surface of the box.

15. A clamping device for mechanical and electrical connection to a hollow metal box, comprising:

a elongated base which spans the box and having a pair of arms extending from ends of the base for positioning the arms adjacent opposite sides of the box, the elongated base being substantially longer than the length of the arms, one of the arms being engageable with its adjacent side of the box and having a portion which defines an edge for engaging the box to prevent inadvertent movement;

the other of the arms including a threaded opening and a threaded bolt movable therein into engagement with its adjacent side of the box; and first means on an end of the threaded bolt for abrading the outer surface of the side of the box to penetrate the outer surface without penetrating the inside of the hollow box whereby the edge prevents the clamping device from inadvertent movement across the sides of the box as the threaded bolt is being tightened to secure the clamping device to the box.

16. A clamping device for mechanical and electrical connection to a metal box, comprising:

an elongated base which spans the box and having a pair of arms extending from ends of the base for positioning the arms adjacent opposite sides of the box, one of the arms being engageable with its adjacent side of the box and having a portion which defines an edge for engaging the box to prevent inadvertent movement;

the other of the arms including a threaded opening and a threaded bolt moveable therein into engagement with its adjacent side of the box, the threaded bolt includes a head portion having formed therein a bore for receiving an electrical conductor, a second threaded opening, and a securing screw for securing the electrical conductor to the head portion, and first means on an end of the threaded bolt for abrading the outer surface of the side of the box to penetrate the outer surface without penetrating the inside of the box whereby the edge prevents the clamping device from inadvertent movement across the sides of the box as the threaded bolt is being tightened to secure the clamping device to the box.

17. A clamping device for mechanical and electrical connection to a hollow metal box, comprising:

an elongated base which spans the box and having a pair of arms extending from ends of the base for positioning the arms adjacent opposite sides of the box, the elongated base being substantially longer than the length of the arms, one of the arms being engageable with its adjacent side of the box, the other of the arms including a threaded opening and a threaded bolt moveable therein into engagement with the adjacent side of the box;

first means on an end of the threaded bolt for abrading the outer surface of the side of the box to penetrate the outer surface without penetrating the inside of the hollow box; and the other end of the threaded bolt includes a head portion containing a securing means movably located on the head portion for securing an electrical conductor to the head portion.

18. The clamping device of claim 17 wherein the other arm with the threaded opening is spaced from the box and the threaded bolt extends from the spaced other arm into engagement with the box to form the electrical connection between the box and the other arm.

19. The clamping device of claim 17 wherein the elongated base and pair of arms are formed of a single unitary bar which establishes a fixed length between the pair of arms.

20. The clamping device of claim 17 wherein the first means comprises an annular abrasive surface.

21. The clamping device of claim 20 wherein the first means further includes a point located within the annular abrasive surface and extending outwardly beyond the annular abrasive surface to abut the hollow metal box before the annular abrasive surface makes contact.

22. The clamping device of claim 17 wherein the head portion includes a bore for receiving the electrical conductor, and the securing means includes a second threaded opening extending into the bore and a securing screw movably located within the second threaded opening for engaging the electrical conductor to clamp it within the bore of the head portion.

* * * * *